United States Patent [19]

Lai

[11] Patent Number: 5,176,523

[45] Date of Patent: Jan. 5, 1993

[54] STACKABLE MEMORY CARD CONNECTOR

[75] Inventor: Ching-ho Lai, Taipei Hsien, Taiwan

[73] Assignee: Foxconn International, Inc., Sunnyvale, Calif.

[21] Appl. No.: 742,883

[22] Filed: Aug. 9, 1991

[51] Int. Cl.$^5$ .............................................. H01R 9/09
[52] U.S. Cl. ..................................... 439/64; 439/377
[58] Field of Search .................. 439/59, 64, 325, 326, 439/329, 259, 260, 377

[56] References Cited

U.S. PATENT DOCUMENTS

| | | | |
|---|---|---|---|
| 3,246,279 | 4/1966 | Storcel | 439/377 |
| 4,017,770 | 4/1977 | Valfre | 439/377 |
| 4,695,116 | 9/1987 | Bailey et al. | 439/188 |
| 4,696,525 | 11/1987 | Coller et al. | 439/69 |
| 4,810,203 | 3/1989 | Komatsu | 439/326 |
| 4,818,239 | 4/1989 | Erk | 439/55 |
| 4,872,843 | 10/1989 | Anstey | 439/69 |
| 4,878,856 | 11/1989 | Maxwell | 439/540 |
| 4,941,841 | 7/1990 | Darden et al. | 439/377 |
| 5,037,330 | 8/1991 | Fulponi et al. | 439/607 |
| 5,044,984 | 6/1990 | Mosser et al. | 439/540 |

FOREIGN PATENT DOCUMENTS

2559335  8/1985  France ............................... 439/64

Primary Examiner—Paula A. Bradley
Attorney, Agent, or Firm—Flehr, Hohbach, Test, Albritton & Herbert

[57] ABSTRACT

A stackable memory card connector assembly (20) for use with multiple memory cards (15, 15') includes a first memory card connector (22) which comprises a side guide arm (32), a second side guide arm (32a) and a housing (24) interconnecting the first and second side guide arms (32, 32a). Further, a top guide (34) extends between the respective first and second side guide arms (32, 32a). The housing (24) defines a plurality of passageways (30, 31) in which a plurality of conductive members (54, 55) are dimensioned to be positioned therethrough. Moreover, respective first and second bottom alignment mechanisms are (56, 56a) disposed on a bottom surface of the respective first and second side guide arms (32, 32a). Similarly, first and second top alignment mechanisms (57, 57a) are disposed on a top surface of the respective first and second side guide arms (32, 32a) opposite the respective first and second bottom alignment mechanisms (56, 56a). Thus, when a second similarly dimensioned memory card connector (22') is stacked above the first memory card connector (22) in an aligned stackable fashion, the respective first and second bottom alignment mechanisms (56', 56a') of the second connector (22') engages with the respective first and second top alignment mechanisms (57, 57a) of the first memory card connector (22). Accordingly, the space occupied by the stacked memory card connector assembly (20) is reduced by providing a single common wall (34) between the stacked connectors (22, 22'), thereby reducing the overall height.

32 Claims, 5 Drawing Sheets

STACKABLE MEMORY CARD CONNECTOR

BACKGROUND OF THE INVENTION

1. Field of the Invention

The present invention relates to electrical connectors and, more particularly, to memory card connectors.

2. Description of the Related Art

Memory cards have recently been developed to improve memory capabilities in computer systems. Their modularity, increased memory capacity and smaller physical dimensions make them particularly desirable, especially in small-sized laptop computers.

Figure 1:
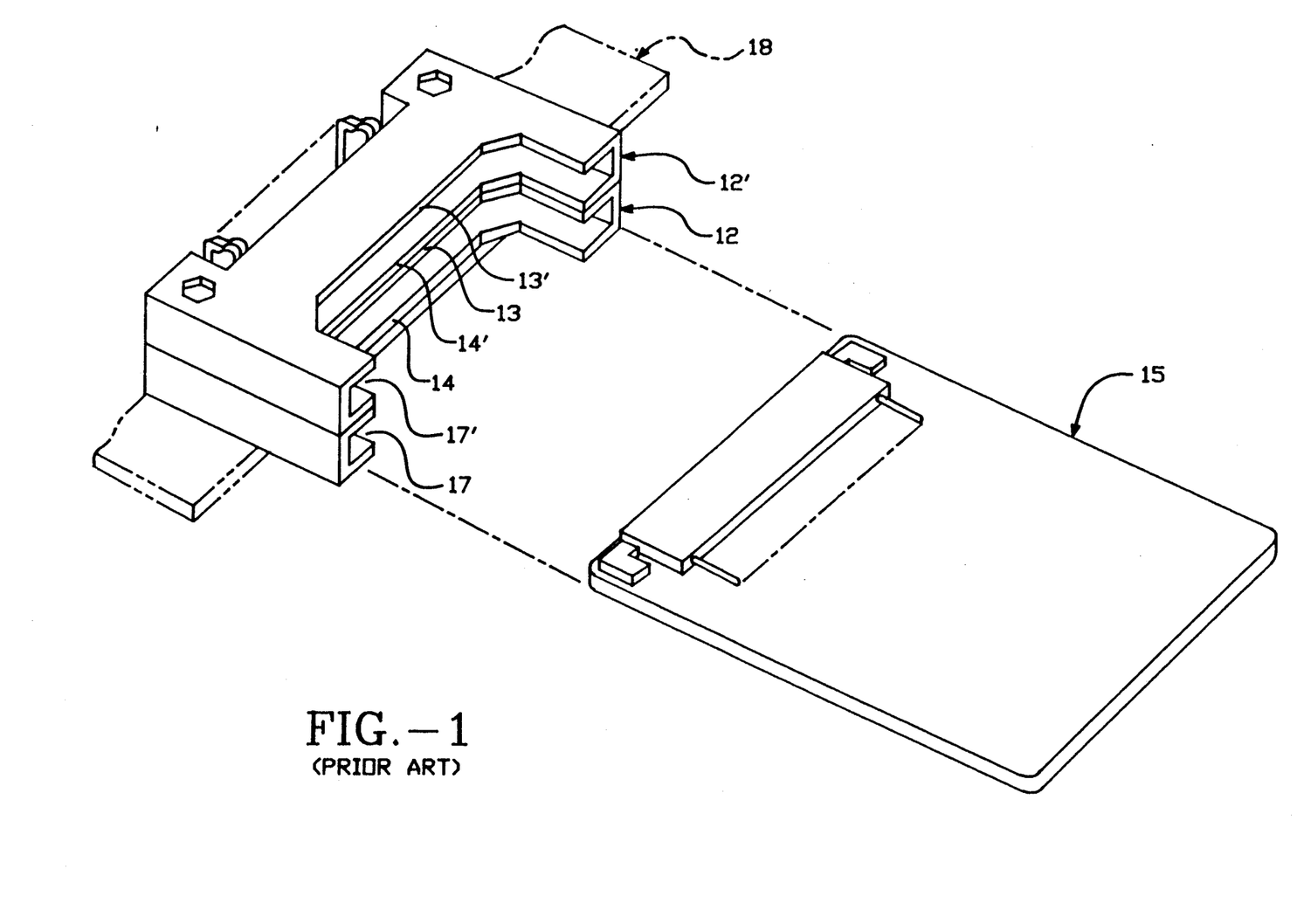
FIG. 1 is a top perspective partially exploded view of a typical memory card and an earlier stacked memory card connector assembly depicting the doubling of the insulative walls between the stacked memory card connectors.

A memory card connector used to interconnect these cards to a computer system should be compact in order to save space. At times, multiple memory cards may be interconnected to a computer system. In those cases, a memory card connector is required for each such card. One approach, to providing a compact arrangement of multiple memory card connectors, is to stack the connectors, one atop another, in an aligned, parallel manner as viewed in FIG. 1. One problem with this approach, however, is that space and material are often wasted when the connectors stacked. FIG. 1 illustrates a typical stacked memory card connector assembly having top connector 12' stacked atop bottom connector 12. Each memory card connector 12 and 12' includes an insulative upper guiding surface 13 and 13', respectively, and an insulative lower guiding surface 14 and 14', respectively. These two coplanar surfaces define a receiving slot 17 and 17' therebetween which receives a memory cards (only one shown). When these connectors are stacked, as may be viewed in FIG. 1, the respective upper guiding surface 13 of the lower memory card connector 12 abuts against the lower guiding surface 14' of the upper memory card connector 12'. The roles of lower surface 14' and upper surface 13, however, could be performed by one surface alone. Furthermore, the use of two surfaces instead of one increases the vertical height of the stacked connectors, which means that the stacked connectors occupy additional space.

Accordingly, there has been a need for a stackable memory card connector assembly which is more space efficient. The present invention meets this need.

SUMMARY OF THE INVENTION

The present invention includes a stackable memory card connector assembly for use with multiple memory cards. The memory card connector assembly of the present invention, comprises a first side guide arm, a second side guide arm and a housing interconnecting the first and second side guide arms. A top guide extends between the respective first and second side guide arms. The housing defines a plurality of passageways in which a plurality of conductive members are dimensioned to be positioned therethrough. Respective first and second bottom alignment mechanisms are disposed on a bottom surface of the respective first and second side guide arms. Similarly, respective first and second top alignment mechanisms are disposed on a top surface of the respective first and second side guide arms opposite the respective first and second bottom alignment mechanisms.

In another aspect of the invention, a second similarly dimensioned memory card connector is stacked above the first memory card connector. A respective first bottom alignment mechanism of the second memory card connector engages with the respective first top alignment mechanisms of the first memory card connector. Moreover, a respective second bottom alignment mechanism of the second memory card connector engages with the respective second top alignment mechanisms of the first memory card connector.

The present invention reduces the space occupied by stacked memory card connectors by providing a single common wall between the stacked connectors. Accordingly, the height of such stacked connectors is reduced.

DETAILED DESCRIPTION OF THE PREFERRED EMBODIMENT

Reference will now be made in detail to the preferred embodiments of the invention. While the present invention has been described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Figure 2:
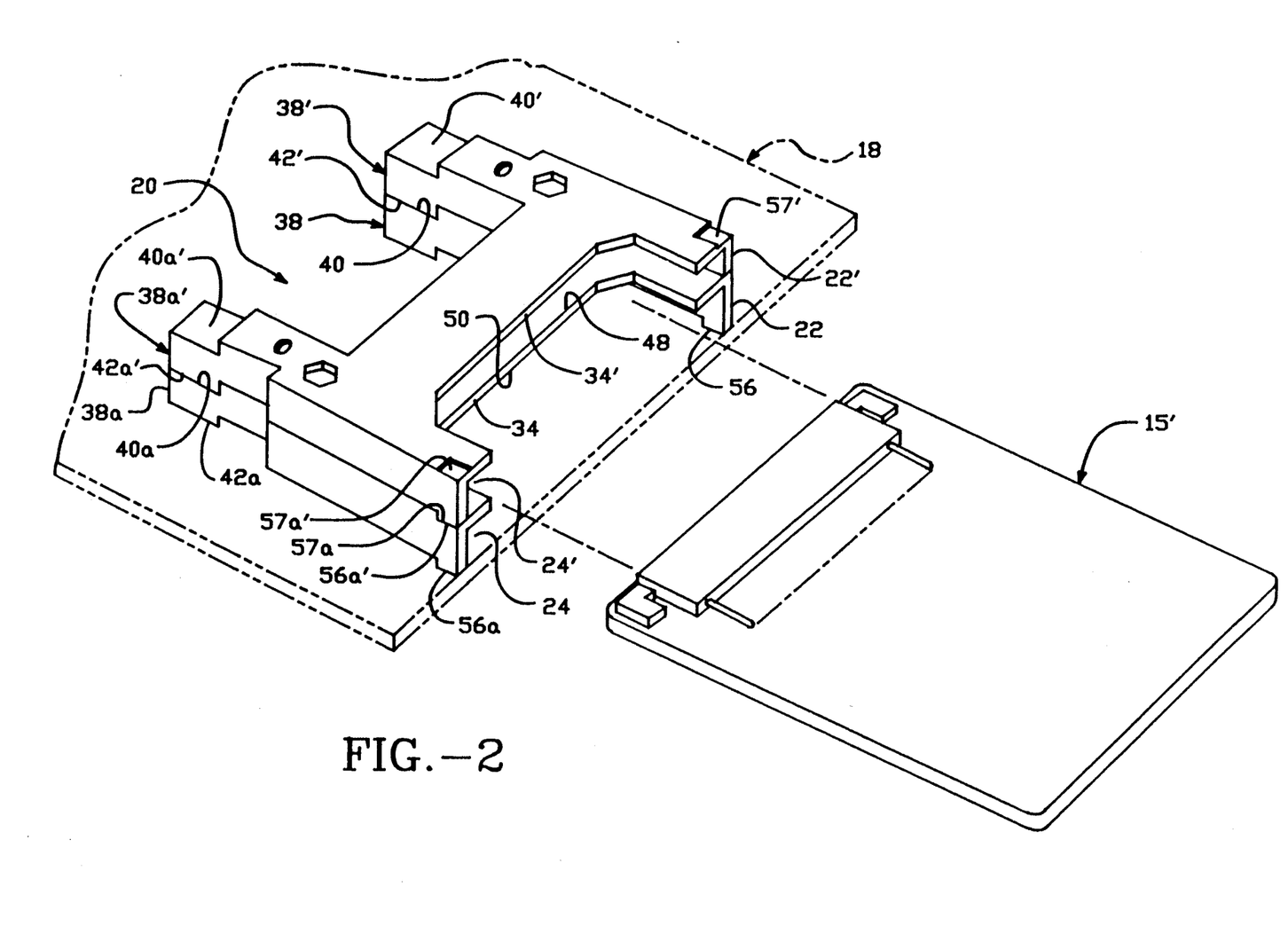
FIG. 2 is a top perspective view of a typical memory card and a presently-preferred embodiment of a stackable memory card connector assembly in accordance with the present invention.

It will be noted here that for a better understanding, like components are designated by like reference numerals throughout the various figures. Attention is now directed to FIG. 2, where the subject stackable memory card connector assembly, generally designated 20, is shown mounted to a printed circuit board (PCB) 18. The memory card connector stack 20 comprises one memory card connector 22' stacked on top of a duplicate memory card connector 22. It will be appreciated, however, that either a single memory card connector 22, or more than two connectors may be mounted to PCB 18 without departing from the true spirit of the present invention. For ease of description, however, a stack consisting of only two memory card connectors 22 and 22' will be discussed.

In accordance with the present invention, memory card connectors 22 and 22' define card slots 24 and 24' respectively, which are dimensioned to receive an electrically conductive end of a first memory card 15 and a second memory card (not shown).

As illustrated in FIG. 2, connectors 22 and 22' are individual units which share a common dividing guide wall 34 therebetween. Thus, only a single insulated guide wall separates cards 15 and 15' rather than the guide walls 13 and 14' of the assembly shown in FIG. 1. In the presently preferred embodiment of FIGS. 2 and 7, it may be seen that the separation height between the stacked memory cards 15 and 15' is reduced by a vertical height approximately equal to the thickness of the top guide wall 34. In effect, the top guide wall 34 of the lower memory card connector 22 further serves as a floor for the receiving slot 24' of the upper memory card connector 22'. Accordingly, the connector assembly of the present invention minimizes the necessary insulation space between the memory card 15, as well as reducing the overall construction material.

Figure 3:
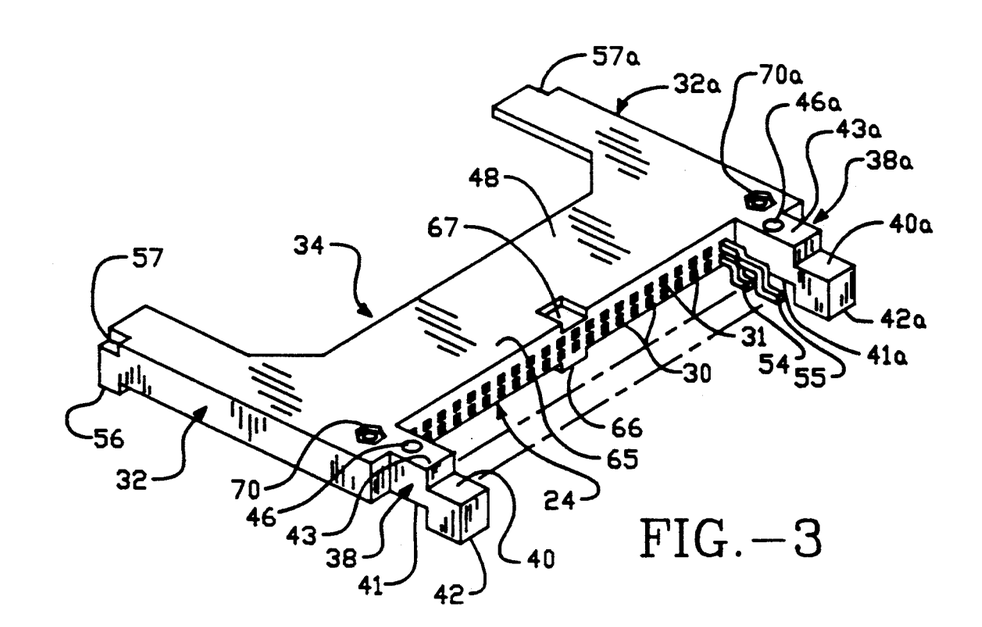
FIG. 3 is a top perspective view of an individual memory card connector of FIG. 2 illustrating a conductive member disposed in a passageway.
Figure 4:
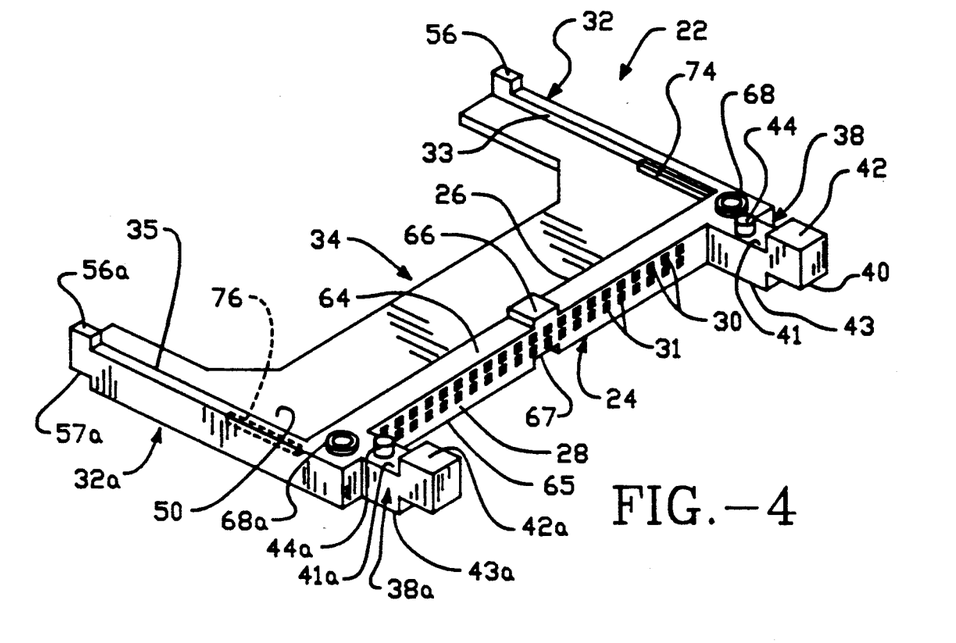
FIG. 4 is a bottom perspective view of the memory card connector of FIG. 3.

Referring now to FIGS. 3 and 4, the subject memory card connector 22 comprises an elongated, insulative housing 24 including a front side 26 and a rear side 28. Housing 24 defines a lower row of passageways 30 and an upper row of passageways 31. Each passageway 30 and 31 extends from the rear side 28 to the front side 26. Each passageway 30 is dimensioned to receive a conductive member 54 which permits electrical communication therethrough, as may be viewed in FIGS. 3 and 5. Similarly, each passageway 31 is dimensioned to receive a conductive member 55. Disposed on one end of elongated housing 24 and extending forward from the front side 26 is a generally planar first side guide arm 32. A second symmetrically-shaped side guide arm 32a extends forward from the opposite end of elongated housing 24 in a direction substantially parallel to the first side guide arm 32. Top guide wall 34 formed integrally with the first and second side guide arms 32 and 32a, respectively, serves as the common wall between the stacked memory cards 15 and 15'. Therefore, referring back to FIG. 2, a top surface 48 of top guide wall 34, serves as the bottom floor of slot 24'. Likewise, the bottom surface 50 of top guide wall 34 serves as the ceiling of slot 24.

Extending from the rear side 28 of housing 24, at opposite ends and in a direction opposite first and second side guide arms 32 and 32a, is a pair of stand-offs 38 and 38a, respectively. Proximate the distal end of each stand-off 38 and 38a is a stand-off step 42 and 42a, respectively, formed on a bottom surface 41 and 41a of stand-off 38 and 38a, respectively. Standoff steps 42 and 42a vertically offset stand-offs 38 and 38a by a small vertical distance D which will be discussed below. A corresponding stand-off step recess 40 and 40a extends downwardly from a top surface 43 and 43a, respectively, opposite steps 42 and 42a. As best viewed in FIG. 2, when connectors 22 and 22' are stacked, the steps 42' and 42a' of upper connector 22' and corresponding step recesses 43 and 43a of lower connector 22 cooperate to align stand-offs 38 and 38a atop stand-offs 38' and 38a', respectively.

On a bottom surface of first and second side guide arms 32 and 32a, proximate each respective distal end, are guide arm steps 56 and 56a, respectively. Guide arm steps 56 and 56a vertically offset the first and second guide arms 32 and 32a by substantially the same vertical distance D that stand-off steps 42 and 42a vertically offset stand-offs 38 and 38a. Situated on a top surface of first and second side guide arms 32 and 32a, opposite guide arms steps 56 and 56a, are guide arm step recesses 57 and 57a which are dimensioned to receive steps 56 an 56a, respectively. Similar to the alignment of the stacked stand-offs, guide arm steps 56' and 56a' of upper connector 22' and the corresponding step recesses 57 and 57a of lower connector 22 cooperate to align guide arms 32' and 32a' atop side guide arms 32 and 32a, respectively, as viewed in FIG. 2.

Centrally positioned on a bottom surface 64 of housing 24 is a housing step 66 which vertically displace the housing 24 by substantially the same vertical distance D as stand-off steps 42 and 42a and as guide arm steps 56 and 56a. Situated on a top surface 65 of housing 24, opposite housing step 66 is a housing step recess 67 dimensioned to receive a housing step 66' which has the same dimensions as step 66. Housing step 66' and corresponding recess 67 align housing 24' to housing 24 when connector 22' is stacked atop connector 22.

As shown in FIG. 4, upstanding posts 44 and 44a extend downward from the bottom surfaces 41 and 41a of stand-offs 38 and 38a, respectively. Opposite the posts 44 and 44a, on the top surface 43 and 43a of stand-offs 38 and 38a, are apertures 46 and 46a which are formed in a vertical corresponding position and with a depth which is not less than the height of the corresponding posts 44 and 44a. It will be noted here that the vertical height of posts 44 and 44a is greater than the vertical offset distance D of stand-off steps 42 and 42a. Moreover, posts 44' and 44a' are dimensioned to snugly insert into apertures 46 and 46a, respectively, to releasably secure stacked memory card connectors 22 and 22' together when they form a stacked assembly 20.

A pair of circular shaped flanges 68 and 68a are positioned on the bottom surface 64 of elongated housing 24 proximate its opposite ends. Again, flanges 68 and 68a vertically offset housing 24 by a vertical distance D substantially similar to steps 56, 56a, 42, 42a and 66. Positioned opposite flanges 68 and 68a on the top surface 65 of housing 24, are a pair of corresponding nut recesses 70 and 70a preferably dimensioned to receive a hexagonal nut (not shown) which will be described in greater detail below. Moreover, nut recesses 70 and 70a are formed to also receive protruding circular flanges 68 and 68a such that when upper connector 22' is stacked atop connector 22, the corresponding lower housing surface 64' abuts upper surface 65 of connector 22.

Figure 5:
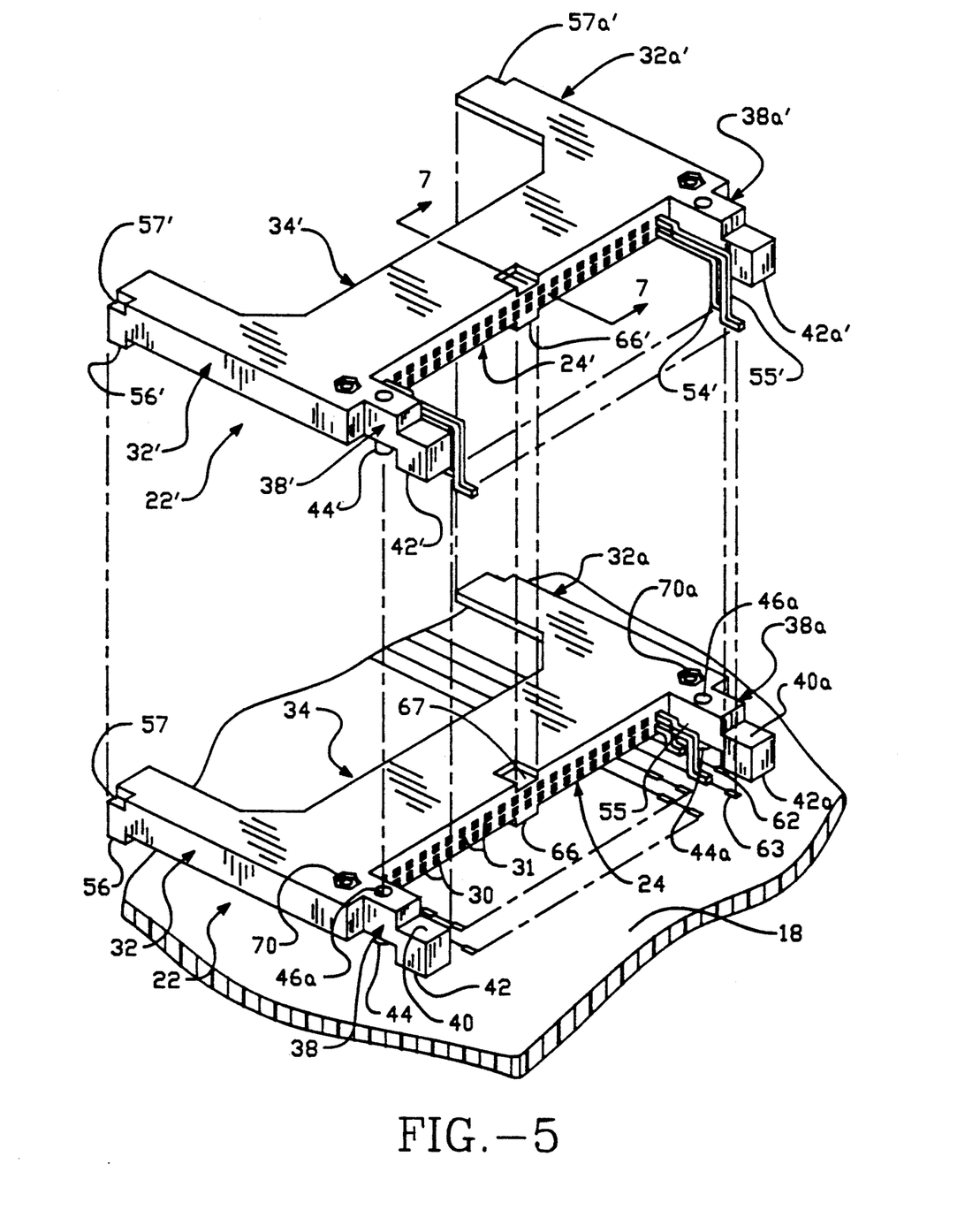
FIG. 5 is a top perspective view of two stackable memory card connectors in accordance with the present invention stacked on a Printed Circuit board.
Figure 7:
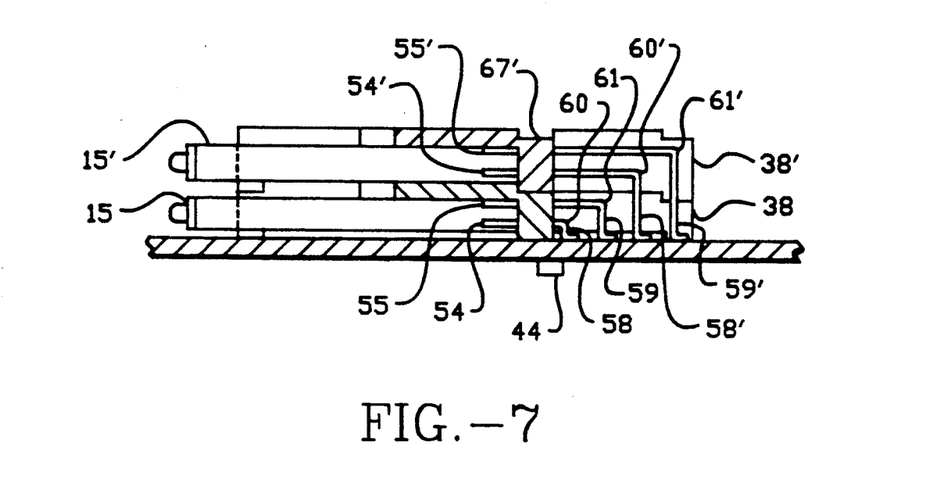
FIG. 7 is a vertical sectional view, taken substantially along the line of 7—7 of FIG. 5, of two stackable memory card connectors of the present invention stacked on a Printed Circuit board.

As mentioned previously, two, generally parallel, rows passageways 30 and 31 extend through the housing 24 from the rear side 28 to the front side 26 and, further, substantially in the direction of the first and second side guide arms 32 and 32a. The conductive members 54 and 55 are inserted through each respective passageway 30 and 31 interconnecting the PCB 18 to the memory card 15. FIGS. 5 and 7 illustrate that each tail portions 58 and 59 are bent substantially perpendicular to passageways 30 and 31, at bends 60 and 61, respectively, in order to engage the corresponding circuit on the PCB 18. Bends 60 and 61 of corresponding conductive members 54 and 55 are positioned at different locations such that the corresponding tail portions 58 and 59 are arranged in two, generally parallel, rows between the stand-offs 38 and 38a.

Figure 6:
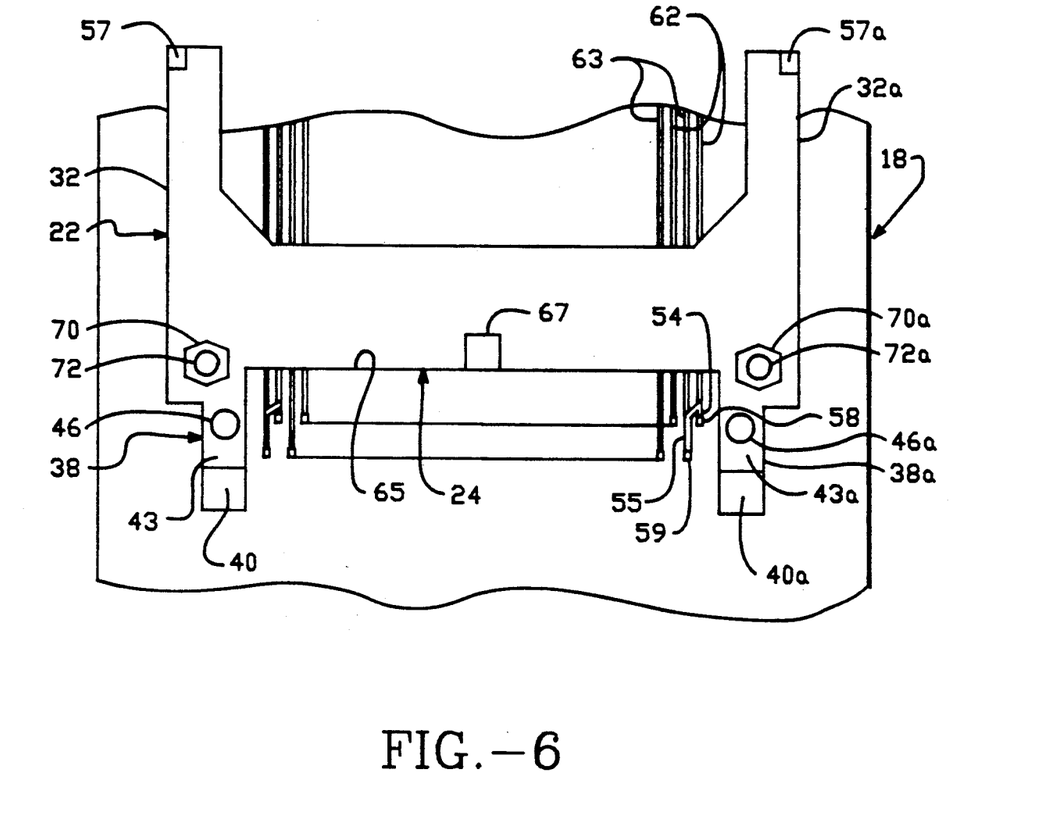
FIG. 6 is a top plan view of the connector of FIG. 2 with additional conductive members disposed in passageways.

In the preferred embodiment, as shown in FIG. 6, the tail portions 59 of the upper row of conductive members 55 are biased from the tail portions 58 of conductive members 54 such that they engage corresponding staggered circuits 63 on the PCB 18. Similarly, tail portions 58 engage corresponding staggered circuit leads 62. Moreover, when memory cards 22 and 22' are stacked, as shown in FIG. 7 and as, further, will be described henceforth, it will be appreciated that the corresponding bends 60' and 61' of upper connector 22' are positioned at locations different from bends 60 and 61 of lower connector 22 to assure that the conductive members 54 and 55 do not contact respective conductive members 54' and 55'. In the preferred form, as best viewed in FIG. 5, both lower row conductive members 54 and 54' may contact the same circuit lead 62. Similarly, both upper row conductive members 55 and 55' may contact the same circuit 63. It will be appreciated, however, that separate circuit leads for each conductive member may be provided if necessary.

FIG. 5 illustrates stackable memory card connectors 22 and 22' being assembled and mounted to PCB 18. It will be appreciated that upon alignment of upper connector 22' to lower connector 22, first and second side guide arms 32' and 32a' of connector 22' are to align with corresponding first and second guide arms 32 and 32a of connector 22. Similarly, stand-offs 38' and 38a' are to align with stand-offs 38 and 38a. Moreover, to assure proper alignment of the posts 44' and 44a' of upper connector 22' snugly engage corresponding post recesses 46 and 46a, respectively, of lower connector 22. In a like manner, stand-off steps 42' and 42a' engage stand-off step recesses 40 and 40a, housing step 66' engages housing step recess 67, flanges 68' and 68a' engage flange recesses 70 and 70a, and finally, guide arm steps 56' and 56a' engage guide arm step recesses 57 and 57a.

The connector assembly according to the present invention provides a stable, compact means for stacking memory card connectors in an efficient, space saving manner which minimizes material waste. The individual memory card connectors of the present invention lack a lower guide plate. This reduces the height of each unit and saves material of the assembly 20, as a whole. Accordingly, in the lower connector 22, the PCB 18 forms the floor of receiving slot 24, as viewed in FIG. 2.

It will be appreciated that adding or reducing the number of alignment posts or steps, and their corresponding post recesses or step recesses, respectively, can easily be accomodated without departing from the true scope and spirit of the present invention.

Because the circuits 62 and 63 are situated on the PCB 18, (shown in FIGS. 5 and 6) insertion of the memory card 15 into the slot 24 may damage the circuits 62 and 63 if the slot height is too small. Therefore, when connector 22 is mounted to the PCB 18, it is offset vertically (vertical offset distance D) by: stand-off steps 42 and 42a of the stand-offs 38 and 38a, respectively; guide arm steps 56 and 56a of first and second guide arms 32 and 32a, respectively; housing step 66; and flanges 68 and 68a. The vertical offset distance D reduces the danger of damage to the circuits 62 and 63 upon insertion of card 15 into slot 24. In the preferred form, the offset distance D is 0.17 mm, corresponds to the vertical height of the corresponding steps. Accordingly, the various offset steps provide the dual function of aligning the connectors 22 and 22', upon stacking, and vertically offsetting the lower connector 22 to reduce the risk of circuit damage upon insertion of card 15.

The connector assembly 20 is stably mounted to PCB 18 by inserting posts 44 and 44a of bottom connector 22 into corresponding apertures (not shown) defined by PCB 18. Moreover, as best viewed in FIG. 6, located centrally in flange recesses 70 and 70a, and in flanges 68 and 68a, respectively, is a pair of apertures 72 and 72a which extend vertically through housing 24 from the top surface 65 of housing 24 to the corresponding bottom surface 64. Upon stacking of connectors 22 and 22', and upon mounting to PCB 18, corresponding mounting bolts (not shown) are positioned through respective bolt apertures (not shown) defined in PCB 18 and through respective apertures 72 and 72a, and apertures 72' and 72a' of respective connectors 22 and 22'. The corresponding bolts are retained by hexagonal nuts (not shown), formed to receive the corresponding bolt threads, which are disposed in hexagonal nut recesses 70 and 70a. Accordingly, when two or more connectors are stacked together, the corresponding bolt lengths must be adjusted to accommodate the number of stacked connectors.

Because of the vertical offset distance D of housing 24, of lower connector 24 it is further appreciated that the flanges 68 and 68a provide vertical support to housing 24 to resist and offset the shearing forces acting on this area due to the respective mounting bolts.

Referring back to FIG. 4, a polarization key 74 is disposed at a corner of the intersection of a first guide arm inner wall 33, of the first guide arm 32, and the top guide plate 34 to assure a correct polarity upon insertion of memory card 15 into slot 24a. Similarly, another polarization key 76 is, preferably, centrally positioned on a second guide arm inner wall 35 of the second guide arm 32a. Accordingly, memory card 15 can only be electrically connected to connector 22 one way, thereby assuring proper polarization.

While the invention has been described in connection with what is presently considered to be the most practical and preferred embodiments, it is to be understood that the invention is not limited to the disclosed embodiment but, on the contrary, is intended to cover various modifications and equivalent arrangements included within the spirit and scope of the appended claims.

Therefore, persons of ordinary skill in this field are to understand that all such equivalent structures are to be included within the scope of the following claims:

What is claimed is:

1. A memory card connector for use with a board comprising:
 a first side guide arm;
 a second side guide arm;
 a housing interconnecting said first and second side guide arms and defining a plurality of passageways;
 a housing-offset disposed on a bottom surface of said housing;
 a single cross-member guide extending between said respective first and second side guide arms; and
 a plurality of conductive members dimensioned to be positioned in corresponding passageways.

2. The memory card connector of claim 1 further including:
 a first recess defined by a bottom surface of said housing;
 a second recess defined by said bottom surface of said housing;
 a first post extending from a top surface of said housing opposite said first recess; and
 a second post extending from said top surface of said housing opposite said second recess.

3. The memory card connector of claim 1 further including:
 a first post extending from a top surface of said housing;

a second post extending from said top surface of said housing;

a first recess defined by a bottom surface of said housing opposite said first post, said first recess being formed and dimensioned to snugly receive a third post formed and dimensioned substantially similar to said first post; and a second recess defined by said bottom surface of said housing opposite said second post, said first recess being formed and dimensioned to snugly receive a fourth post formed and dimensioned substantially similar to said first post.

4. The memory card connector of claim 1 further including:

a first recess defined by a top surface of said housing;

a second recess defined by said top surface of said housing;

a first post extending from a bottom surface of said housing opposite said first recess; and a second post extending from said bottom surface of said housing opposite said second recess.

5. The memory card connector of claim 1 further including:

a first post extending from a bottom surface of said housing;

a second post extending from said bottom surface of said housing;

a first recess defined by a top surface of said housing opposite said first post, said first recess being formed and dimensioned to snugly receive a third post formed and dimensioned substantially similar to said first post; and a second recess defined by said top surface of said housing opposite said second post, said first recess being formed and dimensioned to snugly receive a fourth post formed and dimensioned substantially similar to said first post.

6. The memory card connector of claim 1 further including:

a first stand-off extending from said housing in a direction opposite said first side guide arm; and a second stand-off extending from said housing in a direction opposite said second side guide arm.

7. The memory card connector of claim 1 further including:

a first stand-off extending from said housing in a direction opposite said first side guide arm; and a second stand-off extending from said housing in a direction opposite said second side guide arm;

a first stand-off offset disposed on a bottom surface of said first stand-off; and a second stand-off offset disposed on a bottom surface of said second stand-off.

8. The memory card connector of claim 1 further including:

a first stand-off extending from said housing in a direction opposite said first side guide arm;

a second stand-off extending from said housing in a direction opposite said second side guide arm;

a first stand-off offset disposed on a bottom surface of said first stand-off;

a second stand-off offset disposed on a bottom surface of said second stand-off;

first stand-off alignment means disposed on a top surface of said first stand-off opposite and dimensioned to match said first stand-off offset; and second stand-off alignment means disposed on a top surface of said second stand-off opposite and dimensioned to match said second stand-off offset.

9. The memory card connector of claim further including:

a first stand-off extending from said housing in a direction substantially opposite said first side guide arm; and a second stand-off extending from said housing in a direction substantially opposite said second side guide arm;

wherein said plurality of conductive members are positioned between said first and second stand-offs.

10. The memory card connector of claim 1 further including:

a first stand-off extending from said housing in a direction substantially opposite said first side guide arm;

a second stand-off extending from said housing in a direction substantially opposite said second side guide arm;

a first recess defined by a top surface of said first stand-off;

a second recess defined by said top bottom surface of said second stand-off;

a first post extending from a bottom surface of said first stand-off opposite said first recess; and a second post extending from said bottom surface of said second stand-off opposite said second recess.

11. The memory card connector of claim 10 wherein, said first post is dimensioned to snugly insert into said first recess; and said second post is dimensioned to snugly insert into said second recess.

12. The memory card connector of claim further including:

a first stand-off extending from said housing in a direction substantially opposite said first side guide arm;

second stand-off extending from said housing in a direction substantially opposite said second side guide arm;

a first recess defined by a bottom surface of said first stand-off;

a second recess defined by said bottom surface of said second stand-off;

a first post extending from a top surface of said first stand-off opposite said first recess; and a second post extending from said top surface of said second stand-off opposite said second recess.

13. The memory card connector of claim 12 wherein, said first post is dimensioned to snugly insert into said first recess; and said second post is dimensioned to snugly insert into said second recess.

14. The memory card connector of claim 1 further including:

a first side guide arm-offset disposed on a bottom surface of said first side guide arm; and a second side guide arm-offset disposed on a bottom surface of said second side guide arm.

15. The memory card connector of claim 14 further including:

first side guide arm alignment means disposed on a top surface of said first side guide arm opposite said first side guide arm offset.

16. The memory card connector of claim 14 further including:

first side guide arm alignment means disposed on a top surface of said first side guide arm opposite and dimensioned to match said first side guide arm offset.

17. The memory card connector of claim 14 further including:
    first side guide arm alignment means disposed on a top surface of said first side guide arm opposite said first side guide arm offset; and
    second side guide arm alignment means disposed on a top surface of said second side guide arm opposite said second side guide arm offset.

18. The memory card connector of claim 14 further including:
    first side guide arm alignment means disposed on a top surface of said first side guide arm opposite and dimensioned to match said first side guide arm offset; and
    second side guide arm alignment means disposed on a top surface of said second side guide arm opposite and dimensioned to match said second side guide arm offset.

19. The memory card connector of claim 14 further including:
    housing alignment means disposed on a top surface of said housing opposite said housing offset.

20. The memory card connector of claim 14 further including:
    housing alignment means disposed on a top surface of said housing opposite and dimensioned to match said housing offset.

21. The memory card connector of claim 14 further including:
    first side guide arm alignment means disposed on a top surface of said first side guide arm opposite and dimensioned to match said first side guide arm offset; and
    second side guide arm alignment means disposed on a top surface of said second side guide arm opposite and dimensioned to match said second side guide arm offset; and
    housing alignment means disposed on a top surface of said housing opposite and dimensioned to match said housing offset.

22. A stackable memory card connector system for use with a board comprising:
    (1) a first memory card connector comprising:
        (a) a respective first side guide arm,
        (b) a respective second side guide arm,
        (c) a respective housing interconnecting said first and second side guide arms and defining a plurality of respective passageways,
        (d) a respective single cross-member guide extending between said respective first and second side guide arms at a respective top portion of each of said first and second side guide arms,
        (e) a plurality of respective conductive members disposed in corresponding respective passageways,
        (f) bottom alignment means,
    (2) a second memory card connector comprising:
        (a) a respective first side guide arm,
        (b) a respective second side guide arm,
        (c) a respective housing interconnecting said first and second side guide arms and defining a plurality of respective passageways,
        (d) a respective single cross-member guide extending between said respective first and second side guide arms at a respective top portion of each of said first and second side guide arms,
        (e) a plurality of respective conductive members disposed in corresponding respective passageways, and
        (f) top alignment means;
    (3) wherein said bottom alignment means of said first memory card connector and said top alignment means of said second memory card connector cooperate to align said second memory card connector atop said first memory card connector.

23. The stackable memory card connector system of claim 22 wherein,
    said top alignment means, 2(f), of said second memory card connector comprises a first side guide arm offset disposed on a respective bottom surface of said respective first side guide arm of said second memory card connector, and
    said bottom alignment means, 1(f), of said first memory card connector comprises a first side guide arm recess disposed on a respective top surface of said respective first side guide arm of said first memory card connector wherein,
    said first side guide arm recess positioned opposite and dimensioned to receive said first side guide arm offset.

24. The stackable memory card connector system of claim 22 wherein:
    said top alignment means, 2(f), of said second memory card connector comprises,
        a first side guide arm offset disposed on a respective bottom surface of said respective first side guide arm, and
        a second side guide arm offset disposed on a respective bottom surface of said respective second side guide arm of said second memory card connector; and
    wherein, said bottom alignment means, 1(f), of said first memory card connector comprises,
        a first side guide arm recess disposed on a respective top surface of said respective first side guide arm of said first memory card connector, said first side guide arm recess positioned opposite and dimensioned to receive said first side guide arm offset, and
        a second side guide arm recess disposed on a respective top surface of said respective second side guide arm of said first memory card connector, said second side guide arm recess positioned opposite and dimensioned to receive said second side guide arm offset.

25. The stackable memory card connector system of claim 22 wherein,
    said top alignment means, 2(f), of said second memory card connector comprise a housing offset disposed on a respective bottom surface of said respective housing of said second memory card connector, and
    said bottom alignment means, 1(f), of said first memory card connector comprises a housing recess disposed on a respective top surface of said respective housing of said first memory card connector, said housing recess positioned opposite and dimensioned to receive said housing offset.

26. The stackable memory card connector system of claim 22 further including:
    (1) a respective first and second post extending downward from a bottom surface of said respective housing of said second memory card connector; and (2) a respective first and second post recess defined by a top surface of said respective housing of said first memory card connector, said first and second post recesses positioned opposite said first and second posts of said second memory card connector, respectively;

(3) wherein said respective first post of said second memory card connector snugly engages said respective first post recess of said first memory card connector; and (4) where said respective second post of said second connector snugly engages said respective second post recess of said first memory card connector.

27. The stackable memory card connector system of claim 22 further including:

(1) a respective first and second post extending upward from a top surface of said respective housing of said first memory card connector; and (2) a respective first and second post recess defined by a bottom surface of said respective housing of said second memory card connector, said first and second post recesses positioned opposite said first and second posts of said first memory card connector, respectively;

(3) wherein said respective first post of said first memory card connector snugly engages said respective first post recess of said second memory card connector; and (4) wherein said respective second post of said first connector snugly engages said respective second post recess of said second memory card connector.

28. The stackable memory card connector system of claim 22 wherein, each of said plurality of respective conductive members of said first memory card connector are shorter than each of said plurality of respective conductive members of said second memory card connector.

29. The stackable memory card connector system of claim 22 wherein, said single cross-member guide of said first memory card connector serves as a common wall between said first and second memory card connectors.

30. The stackable memory card connector system of claim 22 wherein;

said top alignment means, 2(f), of said second memory card connector comprises, a respective first side guide arm offset disposed on a respective bottom surface of said respective first side guide arm of said second memory card connector, a respective second side guide arm offset disposed on a respective bottom surface of said respective second side guide arm of said second memory card connector, and a respective housing offset disposed on a respective bottom surface of said respective housing of said second memory card connector; and wherein, said bottom alignment means, 1(f), of said first memory card connector comprises, a respective first side guide arm recess disposed on a respective top surface of said respective first side guide arm of said first memory card connector, said respective first side guide arm recess positioned opposite and dimensioned to receive said respective first side guide arm offset, a respective second side guide arm recess disposed on a respective top surface of said respective second side guide arm of said first memory card connector, said respective second side guide arm recess positioned opposite and dimensioned to receive said respective second side guide arm offset, and a respective housing recess disposed on a respective top surface of said respective housing of said first memory card connector, said respective housing recess positioned opposite and dimensioned to receive said respective housing offset.

31. The stackable memory card connector system of claim 30 wherein, said first memory card connector includes, a respective first side guide arm offset disposed on a respective bottom surface of said respective first side guide arm, opposite and respective first said guide arm recess, a respective second side guide arm offset disposed on a respective bottom surface of said respective second side guide arm, opposite said respective second side guide arm recess, and a respective housing offset disposed on a respective bottom surface of said respective housing, opposite said respective housing recess, wherein, said first memory card connector is offset from the board, by said respective first side guide arm offset, said respective second side guide arm offset and said respective housing offset.

32. A memory card connector mounted to a circuit board comprising:

a first side guide arm;

a second side guide arm;

a housing interconnecting said first and second side guide arms and defining a plurality of passageways;

a single cross-member guide extending between said respective first and second side guide arms;

a plurality of conductive members dimensioned to be positioned in corresponding passageways;

a first side guide arm-offset disposed on a bottom surface of said first side guide arm, said first offset increasing the height between said first side guide arm and the circuit board; and a second side guide arm-offset disposed on a bottom surface of said second side guide arm, said second offset increasing the height between said second side guide arm and the circuit board.

* * * * *

UNITED STATES PATENT AND TRADEMARK OFFICE
CERTIFICATE OF CORRECTION

PATENT NO. : 5,176,523

DATED : January 5, 1993

INVENTOR(S) : Ching-ho Lai

It is certified that error appears in the above-identified patent and that said Letters Patent is hereby corrected as shown below:

Column 8, line 4, claim 9, after "claim" insert ---1---; and

Column 8, line 35, claim 12, after "claim" insert ---1---.

Signed and Sealed this

Nineteenth Day of October, 1993

Attest:

BRUCE LEHMAN

Attesting Officer

Commissioner of Patents and Trademarks